(12) United States Patent
Oxley et al.

(10) Patent No.: US 12,428,066 B2
(45) Date of Patent: Sep. 30, 2025

(54) VEHICLE ROCKER ASSEMBLY

(71) Applicant: Shape Corp., Grand Haven, MI (US)

(72) Inventors: Brian Oxley, Ada, MI (US); Matthew Kuipers, Holland, MI (US)

(73) Assignee: Shape Corp., Grand Haven, MI (US)

( * ) Notice: Subject to any disclaimer, the term of this patent is extended or adjusted under 35 U.S.C. 154(b) by 314 days.

(21) Appl. No.: 18/046,340

(22) Filed: Oct. 13, 2022

(65) Prior Publication Data

US 2023/0111879 A1    Apr. 13, 2023

Related U.S. Application Data

(60) Provisional application No. 63/255,053, filed on Oct. 13, 2021.

(51) Int. Cl.
*B62D 25/02* (2006.01)
*B62D 21/15* (2006.01)

(52) U.S. Cl.
CPC ......... *B62D 25/025* (2013.01); *B62D 21/157* (2013.01)

(58) Field of Classification Search
CPC ............................ B62D 25/025; B62D 21/157
USPC ........................................................ 296/209
See application file for complete search history.

(56) References Cited

U.S. PATENT DOCUMENTS

| | | | |
|---|---|---|---|
| 6,299,239 B1 | 10/2001 | Sagawa et al. | |
| 10,232,886 B2 * | 3/2019 | Boettcher | B62D 29/001 |
| 2017/0050675 A1 * | 2/2017 | Kellner | B62D 21/15 |
| 2021/0309297 A1 | 10/2021 | Matecki et al. | |

FOREIGN PATENT DOCUMENTS

| | | |
|---|---|---|
| JP | 2009274658 A | 11/2009 |
| WO | 2012026028 A1 | 3/2012 |

OTHER PUBLICATIONS https://www.math.net/oblique-angle#:~:text=An%20oblique%20angle%20is%20an,between%2090%20and%20180%20degrees (Year: 2024).*
International Search Report for Application No. PCT/US2022/078061; mailed Feb. 10, 2023; 4pp.

* cited by examiner

*Primary Examiner* — Joseph D. Pape
(74) *Attorney, Agent, or Firm* — Bodman PLC

(57) ABSTRACT

A vehicle rocker assembly includes a sill inner and a sill outer. An upper flange portion of the sill inner is coupled with an upper flange portion of the sill outer, and a lower flange portion of the sill inner is coupled with a lower flange portion of the sill outer to enclose a hollow interior of the vehicle rocker assembly. One of the sill inner or the sill outer includes a reinforcement structure integrated in the sill wall of the respective still inner or sill outer. The reinforcement structure includes walls that each laterally span the hollow interior and form a multi-hollow cross-sectional shape with the sill inner and sill outer.

16 Claims, 7 Drawing Sheets

VEHICLE ROCKER ASSEMBLY

CROSS-REFERENCE TO RELATED APPLICATION

This application claims priority under 35 U.S.C § 119(e) to U.S. Provisional Patent Application No. 63/255,053, filed Oct. 13, 2021, the disclosure of this prior application is considered part of this application and is hereby incorporated by reference in its entirety.

TECHNICAL FIELD

The present disclosure relates to elongated vehicle frame and body structures, such as rocker and sill assemblies, battery tray reinforcements, and related structural components.

BACKGROUND

Vehicle frames and body structures are designed to support the vehicle and undergo and absorb certain levels of impact forces, such as to prevent distances of inboard intrusion into the vehicle in accordance with insurance requirements and other regulatory and legal requirements. Side impacts to a vehicle are commonly tested with side pole impact testing, which direct significant side impact forces to the vehicle. Vehicle frames primarily absorb these side impacts at rocker sections that run longitudinally between the front and rear wheels along the lower outboard portions of the vehicle frame.

With the incorporation of battery trays in electric and hybrid electric vehicles in the lateral inboard area between opposing rocker sections, it is desirable for the side impact intrusion distance to be reduced in order to maximize available battery storage volume in the battery trays. For example, it is generally known to increase stiffness of a rocker section to reduce the inboard distance of a side impact intrusion, such as by adding internal reinforcements to a rocker section.

SUMMARY

The present disclosure provides a vehicle reinforcement component, such as a rocker assembly. Examples of the vehicle reinforcement component and rocker assembly may include a sill inner comprising a sill wall portion, an upper wall portion, a lower wall portion, an upper flange portion, and a lower flange portion. The vehicle reinforcement component and rocker assembly may also include a sill outer comprising a sill wall portion, an upper wall portion, a lower wall portion, an upper flange portion, and a lower flange portion. In some examples, the upper flange portion of the sill inner is coupled with the upper flange portion of the sill outer, and the lower flange portion of the sill inner is coupled with the lower flange portion of the sill outer to enclose a hollow interior of the vehicle rocker assembly. In some examples, one of the sill inner or the sill outer includes a reinforcement structure integrated in the sill wall of the respective sill inner or sill outer. In some examples, the reinforcement structure includes an upper wall and a lower wall each spanning the hollow interior and configured to carry a side impact load path from the sill outer to sill inner.

Implementations of the disclosure may include one or more of the following optional features. In some examples, the vehicle rocker assembly includes an outer wall section adjacent to the sill outer. In some implementations, the outer wall section is configured to receive a side impact force where the outer wall section is configured to engage one or more of the sill outer and the reinforcement structure.

In some examples, the reinforcement structure includes an arcuate shape between the upper wall and the lower wall. The arcuate shape may include a radius of curvature that is configured to control transverse deformation of the reinforcement structure. In some examples, the angle provided at the arcuate shape is less than 50 degrees. In some examples, the angle provided at the arcuate shape is between 10 and 30 degrees, such as approximately 20 degrees.

In some implementations, the upper wall portion and the lower wall portion form a plurality of tubular sections extending along a length of the reinforcement structure. In some examples, the plurality of tubular sections includes at least a first tubular section, a second tubular section, and a third tubular section.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

Like reference numerals indicate like parts throughout the drawings.

DETAILED DESCRIPTION

Figure 1:
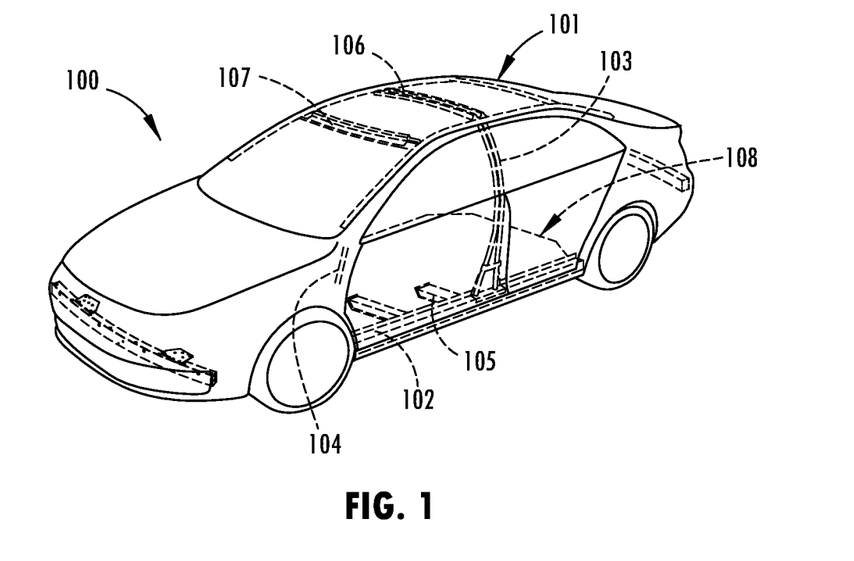
FIG. 1 is an upper perspective view of a vehicle schematically showing a rocker assembly and other structural components.
Figure 2:
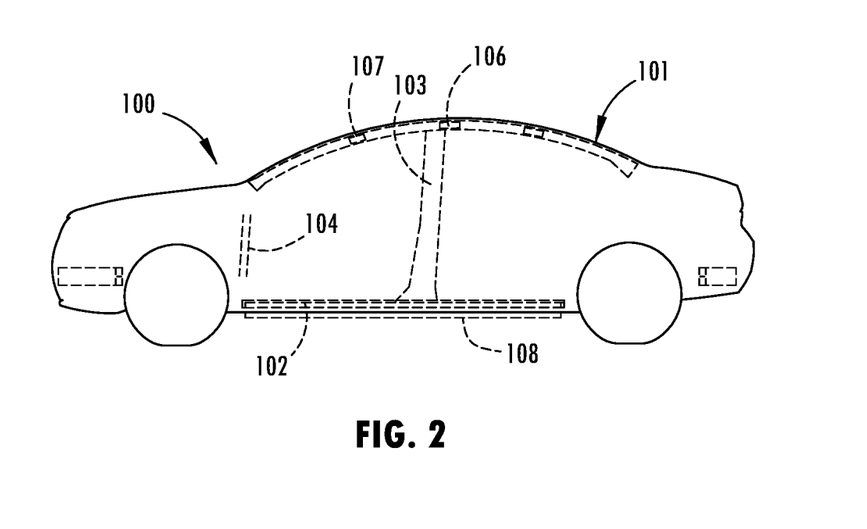
FIG. 2 is a side elevation view of a vehicle schematically showing a rocker assembly and other structural components.
Figure 3:
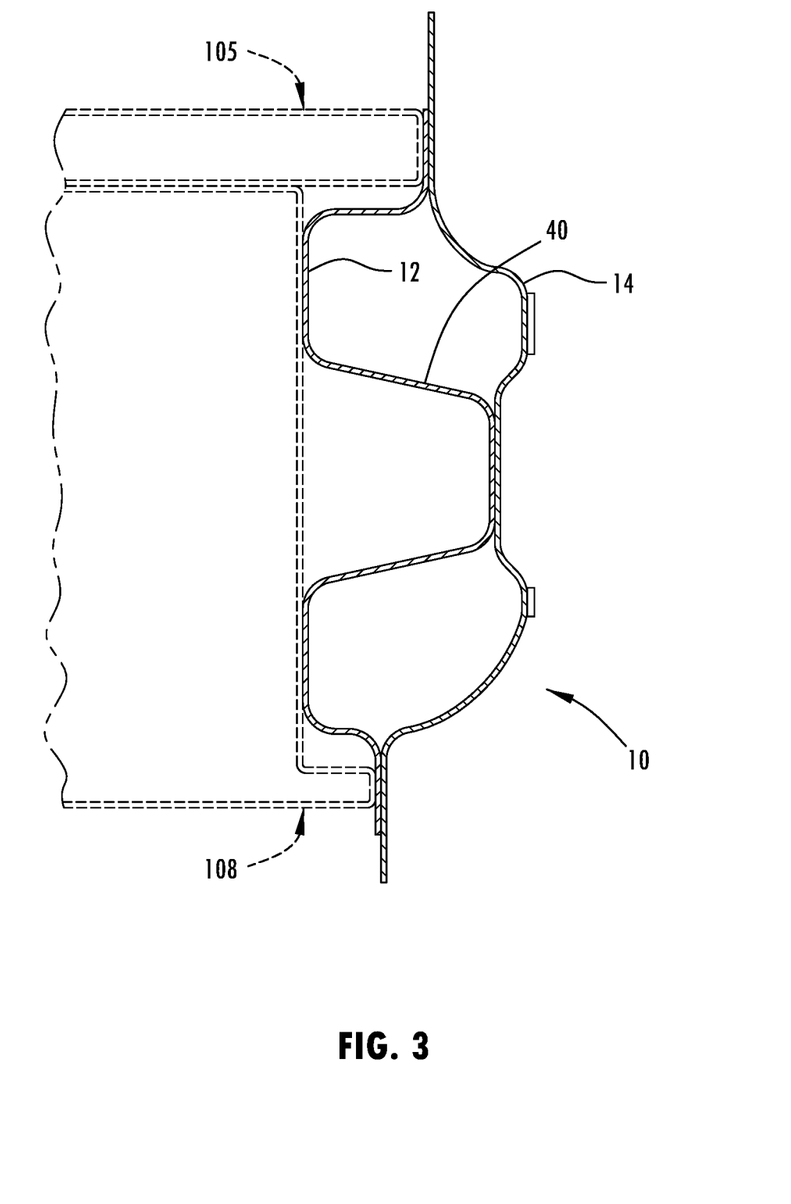
FIG. 3 is a cross-sectional view of an example of a vehicle rocker assembly having a reinforcement structure.

Referring now to the drawings and the illustrative embodiments depicted therein, a vehicle reinforcement component is provided for a vehicle 100, such as for a body structure or frame 101 as shown in FIGS. 1 and 2. The vehicle frame 101 and associated components may have various designs and configurations, such as for different styles and types of vehicles. As shown for example FIGS. 1 and 2, the vehicle reinforcement component may be implemented as a vehicle rocker assembly 102, among other vehicle components, such as a B-pillar 103, a hinge pillar 104, a floor cross-member 105, a roof bow 106, or a header 107, among other conceivable structural components. Also, the vehicle may be partially operated by a propulsion system that uses a battery, such as a traction battery or battery modules, which may be supported in a battery structure or tray 108 generally located between the axles and near the floor of the vehicle to distribute the battery weight and establish a low center of gravity for the vehicle. For example, as shown in FIG. 3, a multi-hollow vehicle reinforcement component may comprise a vehicle rocker assembly 10 disposed along a battery case or tray 108. An outer sill panel 14 is attached to an inner sill panel 12, such as shown in FIG. 3, where the inner sill panel 12 has internal reinforcement walls that extend outboard to form a multi-tubular rocker structure that is disposed alongside an outer section of a battery tray 108, with the floor cross-member 105 also being attached to the vehicle rocker assembly 10 so as to span laterally in the vehicle 100 over the battery tray 108. Accordingly, the vehicle reinforcement component in additional implementations may also or alternatively be partially or fully integrated with a battery tray, such as to be a battery tray component or portion thereof. For instance, in some examples, the vehicle reinforcement component is a longitudinally oriented side wall section of the battery tray. Further, the vehicle reinforcement component may be embodied as the entire piece or as part of the respective vehicle reinforcement component. The vehicle reinforcement component may also include or integrate a body outer panel disposed at an end of the floor cross member 105 to partially form the exterior body structure of the vehicle.

The vehicle reinforcement component, whether implemented as a structural component or a battery tray component or the like, may be designed to undergo various impact forces and to support and sustain different loading conditions. When designing the vehicle reinforcement component with a reinforcement structure disclosed herein, the outer dimensions of the vehicle reinforcement component may be reduced and the overall weight of the vehicle reinforcement component may be reduced while meeting or exceeding the required impact and loading conditions. The reinforcement structure that provides the additional stiffness and strength may span a partial section or the entire length of the vehicle reinforcement component. The reinforcement structure disclosed herein may comprise the entire vehicle reinforcement component or may be joined to additional reinforcements or parts of the vehicle reinforcement component, such as at desired sections thereof. For example, the reinforcement structure may be integrally formed with one or more additional components, which may eliminate or reduce reliance on more expensive welding techniques, such as laser welding or MIG welding within a hollow component and also may eliminate the need for additional components. Moreover, the reinforcement structure disclosed herein may be formed with a sheet material, such as by roll forming a metal sheet, to provide the structure with a relatively high strength (for shear and axial loading) and low weight in comparison to common rocker panels, such as to allow the still panels of the corresponding vehicle reinforcement component (if provided) to use less material, occupy a smaller packaging space, and have greater flexibility in the outer shape design.

The vehicle reinforcement component and reinforcement structure is a thin-walled structure as shown in the cross-sectional shapes; however, the cross-sectional shape of different examples of the vehicle reinforcement component and reinforcement structure may include various shapes and thicknesses for the desired application of the vehicle reinforcement component. The vehicle reinforcement component in some examples may be an elongated rocker component that extends along the length of the vehicle and that includes a sill panel or panels, such as a sill inner panel 12 and sill outer panel 14 that attach together around an interior area 16. As used herein, the terms "inner" and "outer" are made in reference to inboard or inward facing and outboard or outward facing directions in a width or lateral direction on a vehicle, such the vehicle 100 oriented in FIG. 1. The sill inner 12 or the sill outer 14 may integrate a reinforcement structure 40 in the sill wall of the respective still inner 12 or sill outer 14, such as shown in FIGS. 3-10. The reinforcement structure 40 may disposed within the hollow interior space 16 of the vehicle rocker assembly 10 between the first and second sill panels 12, 14, so as to form a multi-tubular structure. The reinforcement structure may have a multi-tubular shape that has two or more hollow interior areas that extend within the interior area of the vehicle reinforcement component. The cross-sectional shape or profile of the reinforcement structure may generally have a consistent shape along the length of the reinforcement structure, such as to provide a consistent structural support, stiffness, and strength along the reinforcement structure.

Unless specified to the contrary, it is generally understood that additional implementations of the rocker component may have an opposite orientation from the examples shown and described, such as where the sill panels identified as an inner panel may be used as the outer panel and the sill panels identified as an outer panel may be used as the inner panel. The cross-sectional shape of the inner and outer panels may vary along the vehicle reinforcement component, such as, for example, by flaring outward at the ends (as may be used for rocker or B-pillar implementations).

Figure 4:
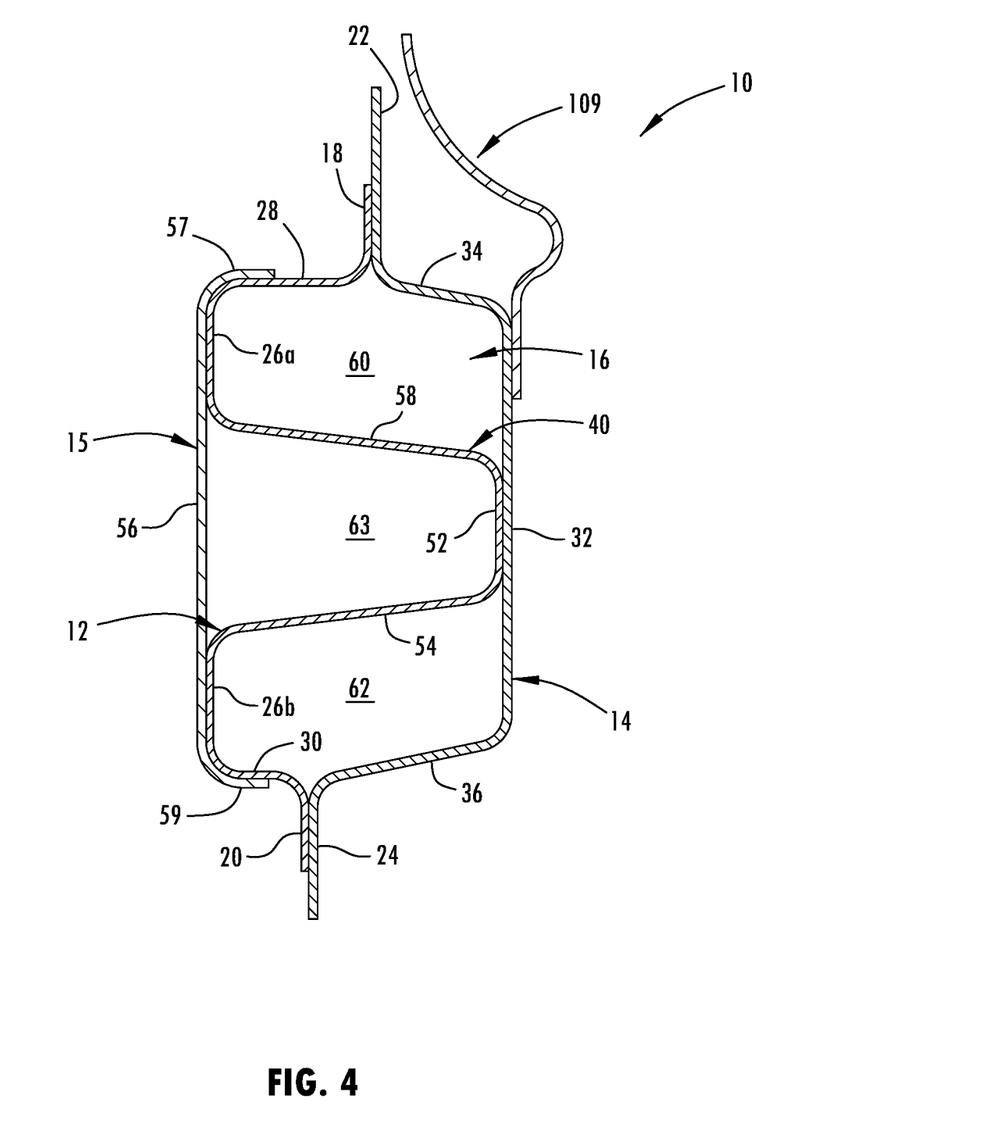
FIG. 4 is a cross-sectional view of another example of the vehicle rocker assembly having the reinforcement structure.

Referring now to the vehicle reinforcement component 10 shown in FIG. 4, a first sill panel 12 and a second sill panel 14 are attached together to surround a hollow interior space 16 between the sill panels 12, 14. The vehicle reinforcement component 10 shown in FIG. 4 is embodied as a vehicle rocker component. Accordingly, the first sill panel 12 may be referred to as a sill inner panel of a rocker component. The first sill panel 12 has an upper flange 18 and a lower flange 20 that extend along respective upper and lower edges of the inner panel. The first sill panel 12 protrude inboard from the upper and lower flanges 18, 20 to form outward facing concave structures. The second sill panel 14, which may be referred to as a rocker outer panel of a rocker component, has a C-shaped cross section with flanges 22, 24, which may similarly be referred to as an upper flange 22 and a lower flange 24. The upper flanges 18, 22 and the lower flanges 20, 24 of the inner and outer sill panels 12, 14 are attached together, such as via welding, with the concave structures of the facing each other. The upper and lower flanges 18, 20, 22, 24 of each of the sill panels 12, 14 shown in FIG. 4 extend longitudinally, continuously along the edges of the rocker component; however, it is contemplated that the flanges may be trimmed away in select areas to facilitate frame attachment or to reduce weight.

As further shown in FIG. 4, the inner and outer sill panels 12, 14 are joined together to define a hollow interior space 16 between the sill panels 12, 14. The hollow interior space 16 shown in FIG. 4 is divided into two enclosed tubular sections 60, 62, so as to form as an elongated multi-tubular member. The upper and lower flanges 18, 20, 22, 24 are substantially planar and oriented in a generally vertical configuration, such as to mate in generally continuous contact along the length of the component. The upper and lower flanges 18, 20, 22, 24 may be joined together via welding, and preferably spot welding, although it is conceivable that alternative welding methods or joining means may be used in addition or in the alternative to spot welding in different implementations of a rocker component, such as adhesive or fasteners or the like.

The first sill panel 12, or inner panel of the rocker component 10, has an inner wall that is substantially planar and divided into two sections, an upper section 26a and a lower section 26b. The upper and lower sections 26a, 26b integrally interconnect with a corner transition to an upper wall 28 and a lower wall 30 at the respective upper and lower ends. The corner transitions are approximately 90 degrees between the inner wall sections 26a, 26b and the upper and lower walls 28, 30. Also, the corner transitions are defined by the longitudinal bends to a sheet material that forms the first sill panel 12, such as a metal sheet (e.g., an advanced high strength steel sheet). Similarly, the upper and lower walls 28, 30 each have a corner transition of approximately 90 degrees to the upper flange 18 and the lower flange 20, respectively. The corner transitions are also defined by longitudinal bends in the sheet material of the first sill panel 12. As also shown in FIG. 4, the upper and lower flanges 18, 20 are substantially planar and oriented in parallel alignment with the planar extent of the inner wall sections 26a, 26b. The upper and lower walls 28, 30 of the first sill panel 12 are also substantially planar and, as shown in FIG. 4, are substantially parallel to each other, although in additional examples they may be slightly angled from each other. The corner transitions may also have an angular transition greater or less than shown in FIG. 4, such as approximately between 40 and 120 degrees, between 70 and 100 degrees, between 80 and 95 degrees, or between 82 and 92 degrees.

As also shown in FIG. 4, the second sill panel 14 or outer panel of the vehicle rocker assembly 10 has an outer wall 32 that is substantially planar and integrally interconnects with an upper wall 34 and a lower wall 36 at its respective upper and lower ends. The corner transitions of approximately 80 degrees between the outer wall 32 and the upper and lower walls 34, 36 are defined by longitudinal bends to a sheet material that forms the second sill panel 14. The sheet material may be the same or different from the first sill panel 12 and may include a metal sheet, such as an advanced high strength steel sheet or aluminum sheet. Similarly, the upper wall 34 also has a corner transition to the upper flange 22 and the lower wall 36 has a corner transition to the lower flange 24, which are each also defined by longitudinal bends in the sheet material of the second sill panel 14. Again, the corner transitions between the upper and lower walls 34, 36 and the upper and lower flanges 22, 24 and the outer wall 32 may have an angular transition greater or less than shown in FIG. 4, such as approximately between 40 and 120 degrees, between 70 and 100 degrees, between 80 and 95 degrees, or between 82 and 92 degrees.

As shown in FIG. 4, the upper and lower flanges 22, 24 are substantially planar and oriented in parallel alignment with the planar extent of the outer wall 32. The upper and lower walls 34, 36 of the second sill panel 14 are also substantially planar, but are slightly angled from being orthogonal to the outer wall 32 and flanges 22, 24. With the flanges 18, 20, 22, 24 of the panels 12, 14 attached together, the walls thereof define a substantially hexagonal cross-sectional shape; however, it is appreciated that additional examples of the reinforcement structure may have various alternative cross-sectional shapes (e.g., a substantially rectangular shape) and different wall configurations for the corresponding vehicle design (e.g., portions of the inner or outer walls that are not vertically oriented). It is also contemplated that one or more of the outer sill 14 or inner sill 12 may include a different configuration including but not limited to the outer sill 14 comprising an inward or outward protruding stiffening rib portion configured to provide additional stiffness and side impact support.

As further shown in FIG. 4, the sill inner 12 includes a reinforcement structure 40 integrated in the sill inner wall. The reinforcement structure 40 has a plurality of longitudinal bends in the metal sheet that each form angular transitions between and define separate wall sections of the reinforcement structure 40. Several wall sections are angled relative to each other to form a tubular shape that surrounds an interior area that extends longitudinally along the reinforcement structure 40. More specifically the sill inner 12 includes the reinforcement structure 40 integrated in the inner sill wall between the upper and lower wall sections 26a, 26b. The reinforcement structure 40, as shown for example in FIG. 4, engages the outer sill panel 14 to form a multi-hollow cross-sectional shape with the sill inner and sill outer panels 12, 14. The reinforcement structure 40 is disposed within the hollow interior space 16 of the vehicle rocker assembly 10 to strengthen the rocker component. By disposing reinforcement structure 40 at the inner volume 16 of the vehicle rocker assembly 10, bulkhead members may not be included to stiffen the inner portion of the rocker component.

As shown in FIG. 4, the reinforcement structure 40 includes an upper wall section 58 and a lower wall section 54 that each span the hollow interior and are configured to carry a side impact load path from the sill outer 14 to the sill inner 12. The wall sections of the reinforcement structure 40 also includes an outer wall section 52 that integrally connects the lower shear wall section 54 and the upper shear wall section 58. The inner walls 26a, 26b of the inner sill panel 12 are substantially planar and integrally interconnects with the upper wall 58 and the lower wall 30 at its respective upper and lower ends. The corner transitions of approximately 80 degrees between the inner walls 16a, 26b, the upper and lower walls 58, 54, and the outer wall section 52 are defined by longitudinal bends to a sheet material that forms the first sill panel 12, such as a metal sheet (e.g., an advanced high strength steel sheet).

The upper and lower shear walls 54, 58 of the reinforcement structure 40 may be disposed at an angle relative to the planar horizontal orientation defined orthogonal to the planar extent of the upper and lower flanges, which may be referred to as an angle of lateral force deflection. The angle of lateral force deflection is configured to control transverse deformation of the reinforcement structure 40. In the example shown in FIG. 4, the upper and lower shear walls 54, 58 of the reinforcement structure are at an angle relative to perpendicular of approximately 20 degrees such that the angle of lateral force deflection is approximately 20 degrees. However, it is also contemplated that one or more of the upper or lower walls of the reinforcement structure may include the angle of lateral force deflection of less than 50 degrees. In another example, the angle of lateral force deflection is between 10 and 30 degrees. In yet another example, the angle of lateral force deflection is between 15 and 25 degrees.

Still referring to FIG. 4, the upper wall section 28, inner wall section 26a, and upper shear wall section 58, together with the upper wall 34 and an upper portion of the outer wall 32 of the outer sill panel 14 form a tubular shape that generally surrounds an upper interior area 60. Also, the lower wall section 30, inner wall section 26b, and lower shear wall section 54 form a tubular shape that generally surrounds a lower interior area 62. Additionally, a central interior 63 area may be defined by the upper shear wall section 58, the lower shear wall section 54, and the outer wall 52 of the inner sill panel 12. The central interior area 63 may further be enclosed by an inner wall 56 of a second inner panel 15, as shown in the example in FIG. 4, or may be defined by another portion of the vehicle. The second inner panel 15 include a C-shape with upper and lower flanges 57, 59 that integrally extend outboard from respective upper and lower ends of the inner wall 56, such as shown in FIG. 4. The tubular shapes surrounding the upper, central, and lower interior areas 60, 63, 62 extend longitudinally along the reinforcement structure in parallel alignment with each other and are shown as mirror images of each other across the mid-wall section 52. However, additional examples of the reinforcement structure may have the tubular shapes unequal in size and/or having dissimilar shapes. Also, various other cross-sectional shapes of the reinforcement structure 40 are contemplated, such as illustrated in FIGS. 5-10. For example, the reinforcement structure may include one or more components of one or more of the sill inner and the sill outer, including but not limited to the flange portions 18, 20, 22, 24; the inner wall 26; the upper wall 28, 34; the lower wall 30, 36; the outer wall 32; the upper wall section 34; and the inner wall section 48.

Figure 5:
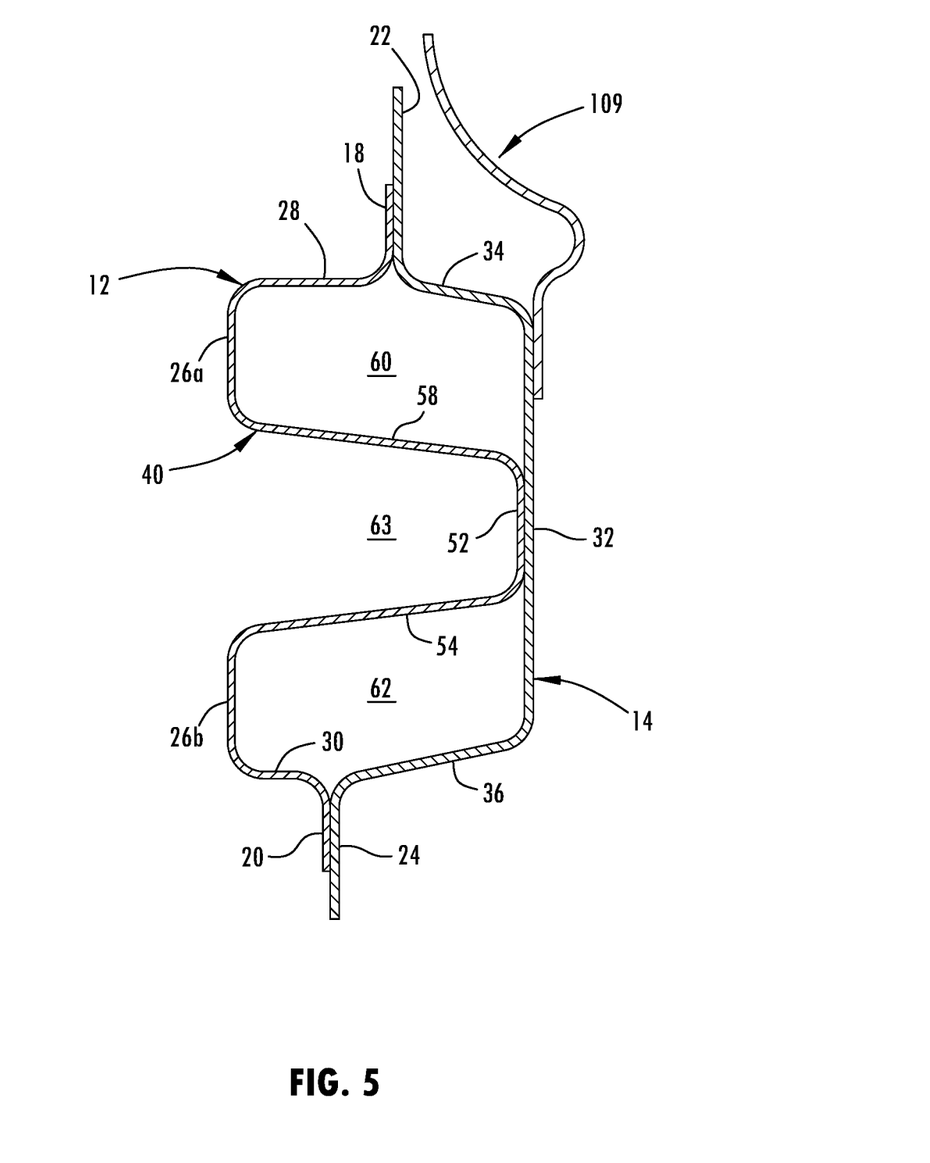
FIG. 5 is a cross-sectional view of another example of the vehicle rocker assembly having the reinforcement structure.
Figure 6:
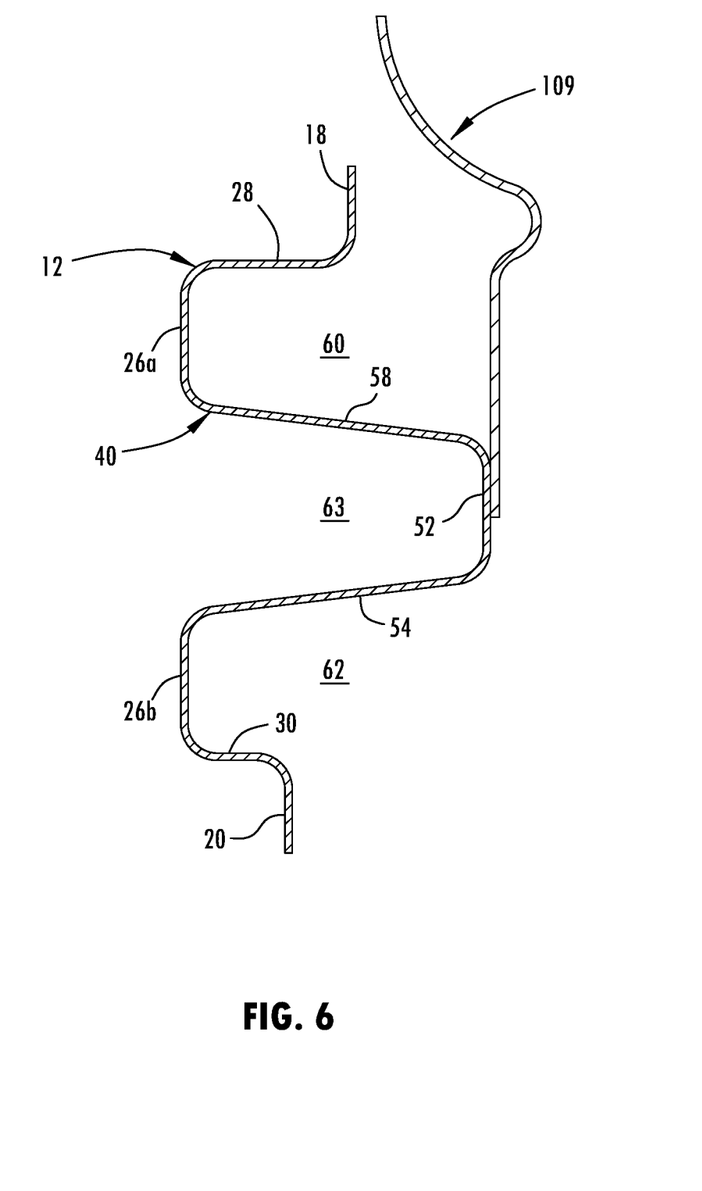
FIG. 6 is a cross-sectional view of another example of the vehicle rocker assembly having the reinforcement structure.
Figure 7:
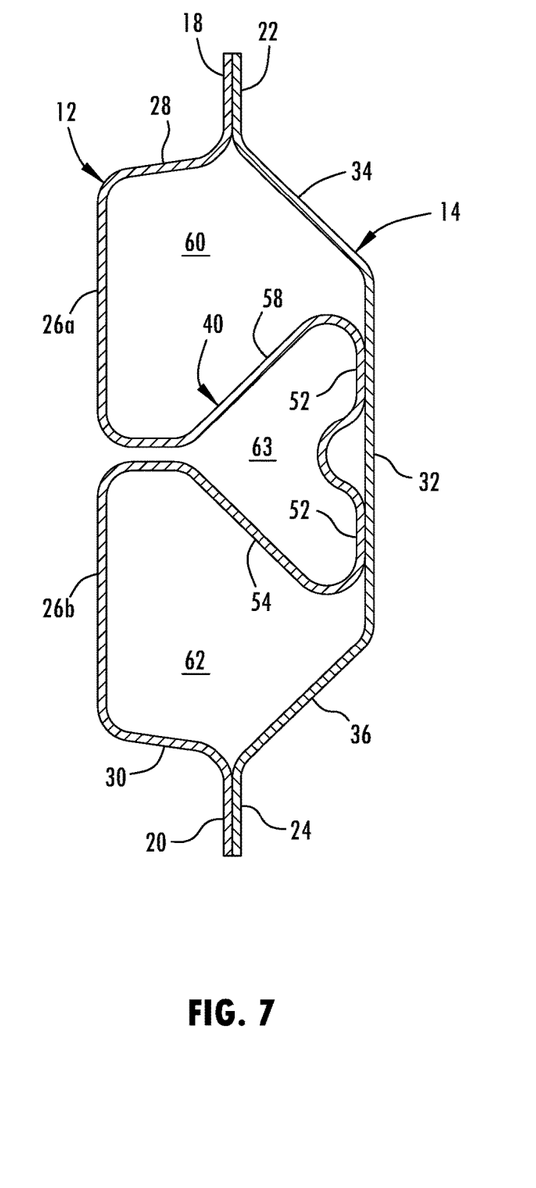
FIG. 7 is a cross-sectional view of another example of the vehicle rocker assembly having the reinforcement structure.
Figure 10:
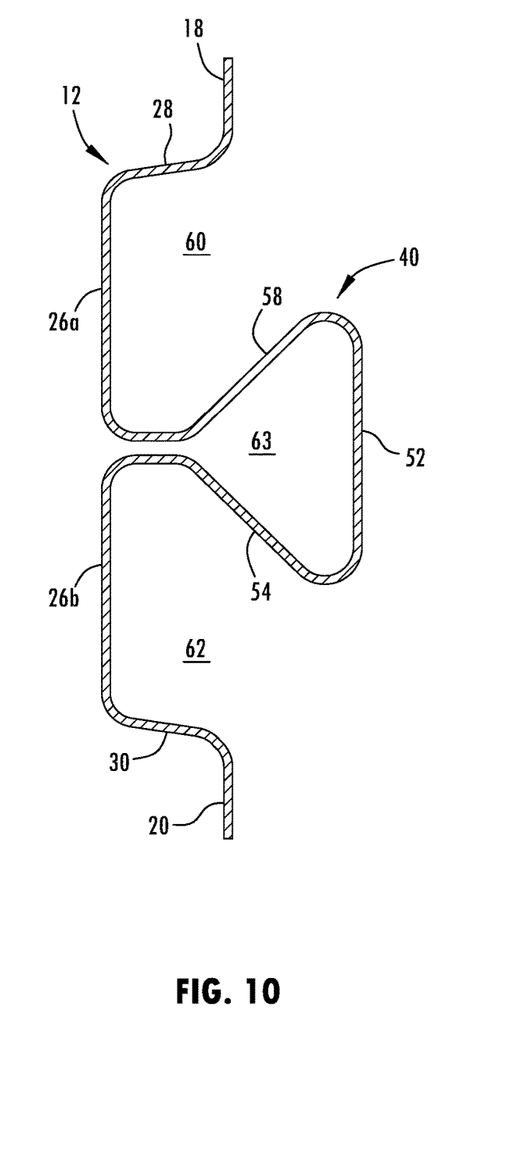
FIG. 10 is a cross-sectional view of another example of the vehicle rocker assembly having the reinforcement structure.

Referring to FIG. 5, one example of the vehicle rocker assembly 10 omits the second inner panel 15 and instead the inner wall sections 26a, 26b of the inner sill panel 12 defines the innermost wall of the vehicle rocker assembly 10. In other examples, such as shown in FIG. 6, the outer sill 14 may be omitted (see FIGS. 6 and 10) and instead the outer wall section 52 of the reinforcement structure 40 defines the outermost wall of the rocker component and may engage directly with the vehicle body outer 109. In still other examples, as shown in FIG. 10, both the second inner panel and the outer sill panel are omitted and the inner wall sections 26a, 26b of the inner sill panel 12 defines the innermost wall of the vehicle rocker assembly 10 and the outer wall section 52 of the reinforcement structure 40 defines the outermost wall of the vehicle rocker assembly 10.

Figure 8:
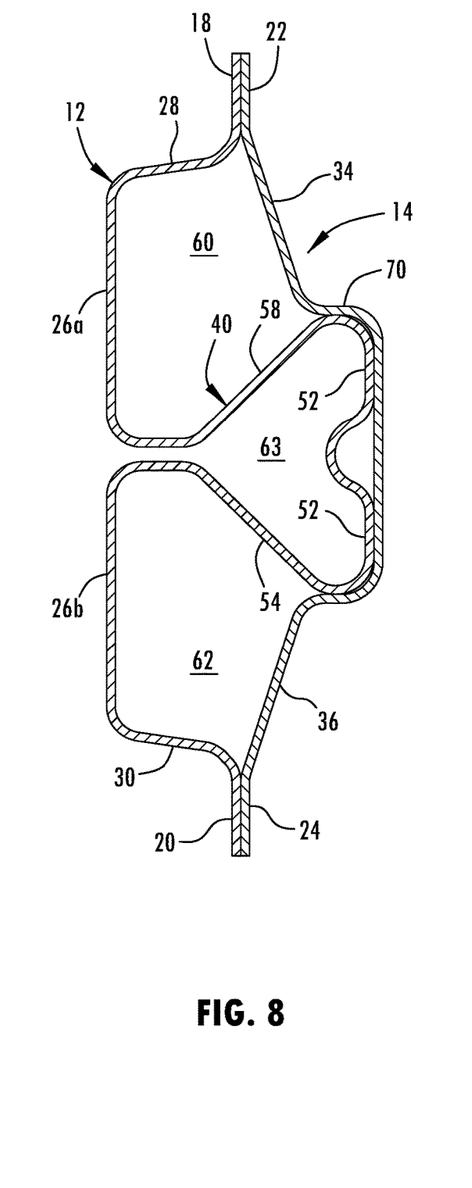
FIG. 8 is a cross-sectional view of another example of the vehicle rocker assembly having the reinforcement structure.
Figure 9:
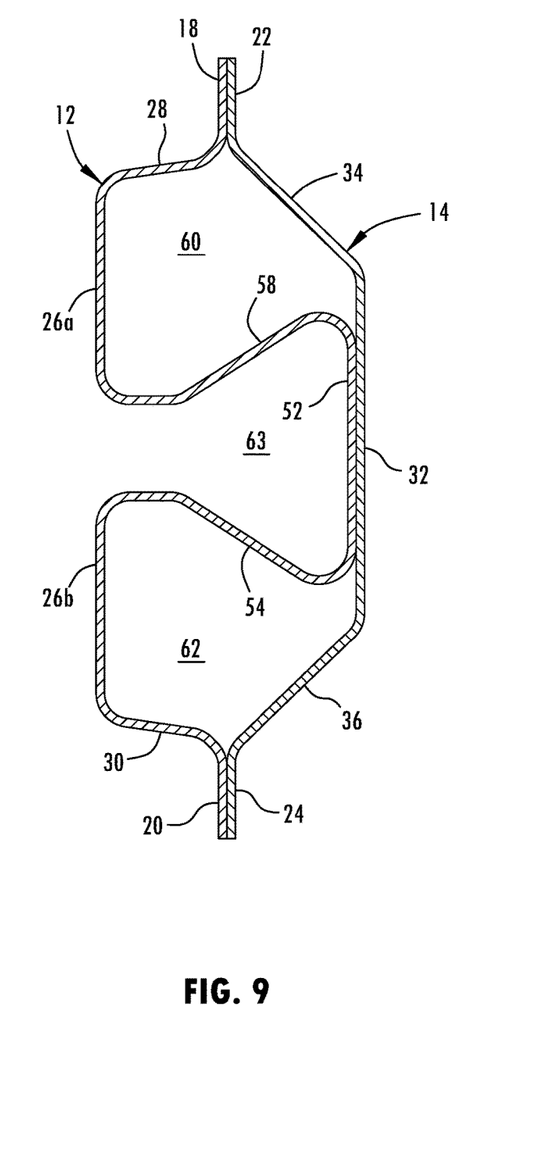
FIG. 9 is a cross-sectional view of another example of the vehicle rocker assembly having the reinforcement structure.

Other examples of rocker components are shown in FIGS. 7-10. In the example shown in FIG. 7, the upper and lower shear walls 54, 58 of the reinforcement structure 40 extend closer to one another on the inboard side of the inner sill 12 before extending laterally generally perpendicular to the outer sill 14 before diverging at the angle of lateral force deflection. In the example shown in FIG. 7, the angle of lateral force deflection is approximately 45 degrees. However, it is also contemplated that one or more of the upper or lower walls 46, 50 of the reinforcement structure 40 may include the angle of lateral force deflection of less than 70 degrees. In another example, the angle of lateral force deflection is between 40 and 60 degrees. In yet another example, the angle of lateral force deflection is between 40 and 50 degrees. Similar to the example shown in FIG. 5, the upper and lower shear walls 54, 58 of the reinforcement structure 40 shown in FIG. 7 extend from the innermost wall to the outer wall section and are joined adjacent to the sill outer 14 and form the outer wall section 52. In the examples shown in FIGS. 7-10 the upper and lower shear walls 54, 58 extend away from each other before extending back towards one another to form the outer wall section 52. In some examples, such as shown in FIG. 8, a portion of the joined upper and lower walls 58, 54 extends back towards the sill inner 12 and away from engagement from the sill outer 14, forming a triangular or general heart shape. It is additionally contemplated that the upper and lower walls 46, 50 may not be symmetrical. Additionally, as shown in FIG. 8, the outer wall 32 of the outer sill 14 may have a jutting portion 70 which extends outwardly and allows more surface area of the outer wall section 52 to be engaged with the outer sill 14.

The jutting portion 70 may be any shape or size corresponding to the shape and size of the reinforcement structure 40. Moreover, as illustrated n FIG. 9, the inner wall sections 48 of the reinforcement structure may be any length before transitioning into the upper and lower shear walls 54, 58.

The inner and outer sill panels and integrated reinforcement structure may be roll-formed from an advanced high-strength steel with a tensile strength above 1,000 MPA, such as approximately 1,500 MPa. The metal sheet used to roll form the reinforcement structure may be approximately 12 mm in thickness, such as between 1.21.6 mm. Also, the steel sheet used for the reinforcement structure and panels of the vehicle reinforcement component may be galvanized, so as to have a zinc coating that protects against corrosion. In some examples, however, the steel sheet of the reinforcement structure may not be galvanized, and in other examples the steel sheets that form the vehicle reinforcement component may not be galvanized. In further examples, the metal sheet that forms the reinforcement structure is an aluminum sheet. The length of the inner sill panel 12 is substantially equal to a length of the outer sill panel 14. In additional implementations, the length of the inner sill panel 12 may be shorter than the length of the hollow interior space of the corresponding component, such as between 40% and 100%, between 30% and 90%, or between 30% and 60% of the length of the reinforcement structure. The sill inner 12 and sill outer 14 may be coupled by welding, using fasteners, adhesive, or another coupling method. The coupling of the reinforcement structure 40 and one of the sill inner 12 and the sill outer 14 may provide additional strength to the vehicle rocker assembly.

Although the reinforcement structure may have a structure that provides sufficient stiffness and strength without additional reinforcement, it is contemplated that the vehicle reinforcement component may include one or more bulkhead members that are disposed generally orthogonally relative to the longitudinal extent of the rocker component. For example, when the outer rocker panel is desired to be further stiffened, such as for protecting battery modules disposed in a tray between rocker assembles, a series of bulkhead members may be disposed at spaced intervals along the hollow interior between an outer wall section of the reinforcement structure and an outer panel of a rocker component. The bulkhead members may connect to the outer panel and/or reinforcement structure with a mechanical fastener, welding, adhesive, or any combination thereof. Moreover, it is contemplated that the inner and outer panels may include wall stiffeners that may be attached at select locations of the inner and outer panels. For example, the wall stiffeners may be attached at and reinforce the rounded corners of the metal sheets that form the inner and outer panels. It is contemplated that additional or alternative attachment locations may be used in other examples.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature; may be achieved with the two components (electrical or mechanical) and any additional intermediate members being integrally formed as a single unitary body with one another or with the two components; and may be permanent in nature or may be removable or releasable in nature, unless otherwise stated.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Furthermore, the terms "first," "second," and the like, as used herein do not denote any order, quantity, or importance, but rather are used to denote element from another.

Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately," "about," and "substantially" may refer to an amount that is within less than 5% of, within less than 1% of, within less than 0.1% of, and within less than 0.01% of a stated amount.

Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle rocker assembly comprising:
   a sill inner comprising a sill wall portion, an upper wall portion, a lower wall portion, an upper flange portion, and a lower flange portion;
   a sill outer comprising a sill wall portion, an upper wall portion, a lower wall portion, an upper flange portion, and a lower flange portion;
   wherein the upper flange portion of the sill inner coupled with the upper flange portion of the sill outer, and the lower flange portion of the sill inner coupled with the lower flange portion of the sill outer to enclose a hollow interior of the vehicle rocker assembly;
   wherein one of the sill inner or the sill outer is formed of a metal sheet and comprises a reinforcement structure formed of the metal sheet and integrated in the sill wall of the respective sill inner or sill outer;
   wherein the reinforcement structure comprises an outer wall, an upper wall, and a lower wall, the upper and lower walls each spanning the hollow interior and configured to carry a side impact load path from the sill outer to the sill inner, and outboard ends of the upper and lower walls integrally connected with the outer wall; and
   wherein the upper wall and the lower wall are substantially planar thin-walled structures and disposed at an oblique angle relative to the outer wall.

2. The vehicle rocker assembly of claim 1, wherein the sill inner comprises the reinforcement structure such that the outer wall is disposed adjacent to the sill outer.

3. The vehicle rocker assembly of claim 2, wherein at least one of the upper wall and the lower wall are disposed at an angle relative to perpendicular with the sill wall portion of one of the sill inner or the sill outer, the angle defined as an angle of lateral force deflection.

4. The vehicle rocker assembly of claim 3, wherein the angle of lateral force deflection is configured to control transverse deformation of the reinforcement structure.

5. The vehicle rocker assembly of claim 4, wherein the angle of lateral force deflection is less than 50 degrees.

6. The vehicle rocker assembly of claim 1, wherein the metal sheet forming the reinforcement structure has a plurality of elongated bends extending continuously in parallel along a length of the vehicle rocker assembly.

7. The vehicle rocker assembly of claim 6, wherein the plurality of elongated bends divide the outer wall, the upper wall, and the lower wall.

8. The vehicle rocker assembly of claim 7, wherein the plurality of elongated bends define a triangular cross-sectional shape of the reinforcement structure.

9. The vehicle rocker assembly of claim 7, wherein the sill inner and the sill outer form a plurality of enclosed tubular sections extending along the length of the vehicle rocker assembly.

10. The vehicle rocker assembly of claim 9, wherein the plurality of tubular sections comprises at least a first tubular section, a second tubular section, and a third tubular section.

11. A vehicle reinforcement component configured to be coupled to a sill outer having an upper flange portion and a lower flange portion, the vehicle reinforcement component comprising:
    an upper flange portion configured to be coupled with the upper flange portion of the sill outer and a lower flange portion configured to be coupled with the lower flange portion of the sill outer to enclose a hollow interior; and
    a reinforcement structure disposed between the upper and lower flange portions and comprising an upper wall and a lower wall that each extend outboard to an outer wall section that integrally connects between outboard ends of the upper wall and the lower wall, the outer wall configured to engage the sill outer between the upper and lower flange portions,
    wherein the outer wall section, the upper wall, and the lower wall are substantially planar thin-walled structures, wherein the upper wall and the lower wall are disposed at an oblique angle relative to the outer wall section, and
    wherein the upper flange portion, lower flange portion, and reinforcement structure are integrally formed together with a metal sheet as a thin-walled structure having a consistent cross-sectional shape along a length of the hollow interior.

12. The vehicle reinforcement component of claim 11, wherein the reinforcement structure comprises arcuate shapes disposed between the upper wall, the lower wall, and the outer wall section that together define a plurality of elongated bends that extend continuously along the length of the hollow interior.

13. The vehicle reinforcement component of claim 12, wherein the arcuate shapes include a radius of curvature that is configured to control transverse deformation of the reinforcement structure.

14. The vehicle reinforcement component of claim 13, wherein the outer wall section, the upper wall, and the lower wall together form a triangular cross-sectional shape.

15. A vehicle reinforcement component comprising:
- an inner panel formed of a metal sheet; and
- an outer panel coupled with the inner panel to enclose a plurality of elongated hollow cavities therebetween,
- wherein the inner panel comprises a reinforcement structure formed of the metal sheet and having an upper wall and a lower wall each integrally extending outboard from an inner wall section of the inner panel,
- wherein outboard ends of the upper and lower walls integrally connect with an outer wall section that is disposed adjacent to the outer panel,
- wherein the outer wall section, the upper wall, and the lower wall are substantially planar thin-walled structures, and
- wherein the upper wall and the lower wall are disposed at an oblique angle relative to the outer wall section.

16. The vehicle reinforcement component of claim 15, wherein the reinforcement structure comprises arcuate shapes disposed between the upper wall, the lower wall, and the outer wall section that together define a plurality of elongated bends that extend continuously along a length of the inner panel.

* * * * *